US009473260B2

(12) United States Patent
Hommel et al.

(10) Patent No.: US 9,473,260 B2
(45) Date of Patent: Oct. 18, 2016

(54) METHOD FOR PERFORMING ANNOUNCEMENTS IN A MEANS OF TRANSPORT

(71) Applicant: Lufthansa Systems Ag, Kelsterbach (DE)

(72) Inventors: Peter Hommel, Bad Homburg (DE); Jörg Liebe, Wiesbaden (DE)

(73) Assignee: Lufthansa Systems Ag, Kelsterbach (DE)

(*) Notice: Subject to any disclaimer, the term of this patent is extended or adjusted under 35 U.S.C. 154(b) by 134 days.

(21) Appl. No.: 14/378,463

(22) PCT Filed: Jan. 23, 2013

(86) PCT No.: PCT/EP2013/051241
§ 371 (c)(1),
(2) Date: Aug. 13, 2014

(87) PCT Pub. No.: WO2013/120673
PCT Pub. Date: Aug. 22, 2013

(65) Prior Publication Data

US 2015/0023522 A1 Jan. 22, 2015

(30) Foreign Application Priority Data

Feb. 14, 2012 (DE) ........................ 10 2012 202 232

(51) Int. Cl.
*H04R 27/00* (2006.01)
*H04H 20/62* (2008.01)
(Continued)

(52) U.S. Cl.
CPC ............. *H04H 20/62* (2013.01); *H04H 20/59* (2013.01); *H04H 60/13* (2013.01)

(58) Field of Classification Search
None
See application file for complete search history.

(56) References Cited

U.S. PATENT DOCUMENTS 4,070,698 A * 1/1978 Curtis ...................... H03G 3/04 360/12
5,034,808 A * 7/1991 Murray .................... H04R 3/12 381/85
(Continued)

FOREIGN PATENT DOCUMENTS

WO WO-2011001433 A2 1/2011

OTHER PUBLICATIONS

European Patent Office, International Search Report for Corresponding International Application No. PCT/EP2013/051241 in the English and German Languages (5 pgs).
(Continued)

*Primary Examiner* — Muhammad N Edun
(74) *Attorney, Agent, or Firm* — Harris Beach PLLC

(57) ABSTRACT

Method for performing announcements in a means of transport that has an announcement device having at least one loudspeaker and an entertainment device, having the following steps: an announcement start signal is sent from the announcement device to the entertainment device at the beginning of an announcement; an interruption to the reproduction of the reproduction appliance is prompted by the entertainment device when the announcement start signal is received; the announcement is reproduced as an audible announcement signal via the announcement loudspeaker; continuation of the reproduction of the reproduction appliance is prompted by the entertainment device when an announcement end signal is received or at the end of reception of the announcement start signal, characterized by detection of an audio signal that is output by the announcement loudspeaker by the entertainment device, wherein the reproduction of the reproduction appliance is automatically interrupted after the audio signal is detected.

11 Claims, 1 Drawing Sheet

(51) Int. Cl.
*H04H 20/59* (2008.01)
*H04H 60/13* (2008.01)

(56) References Cited

U.S. PATENT DOCUMENTS 5,781,852 A * 7/1998 Gropper ................. H04H 20/59
455/181.1
6,813,777 B1 11/2004 Weinberger et al.
8,041,052 B2 * 10/2011 Hopkins ................ H04B 1/207
381/123

OTHER PUBLICATIONS

European Patent Office, Written Opinion of International Searching Authority for Corresponding International Application No. PCT/EP2013/051241, date of mailing Mar. 22, 2013, in the English and German Languages (12 pgs).

* cited by examiner

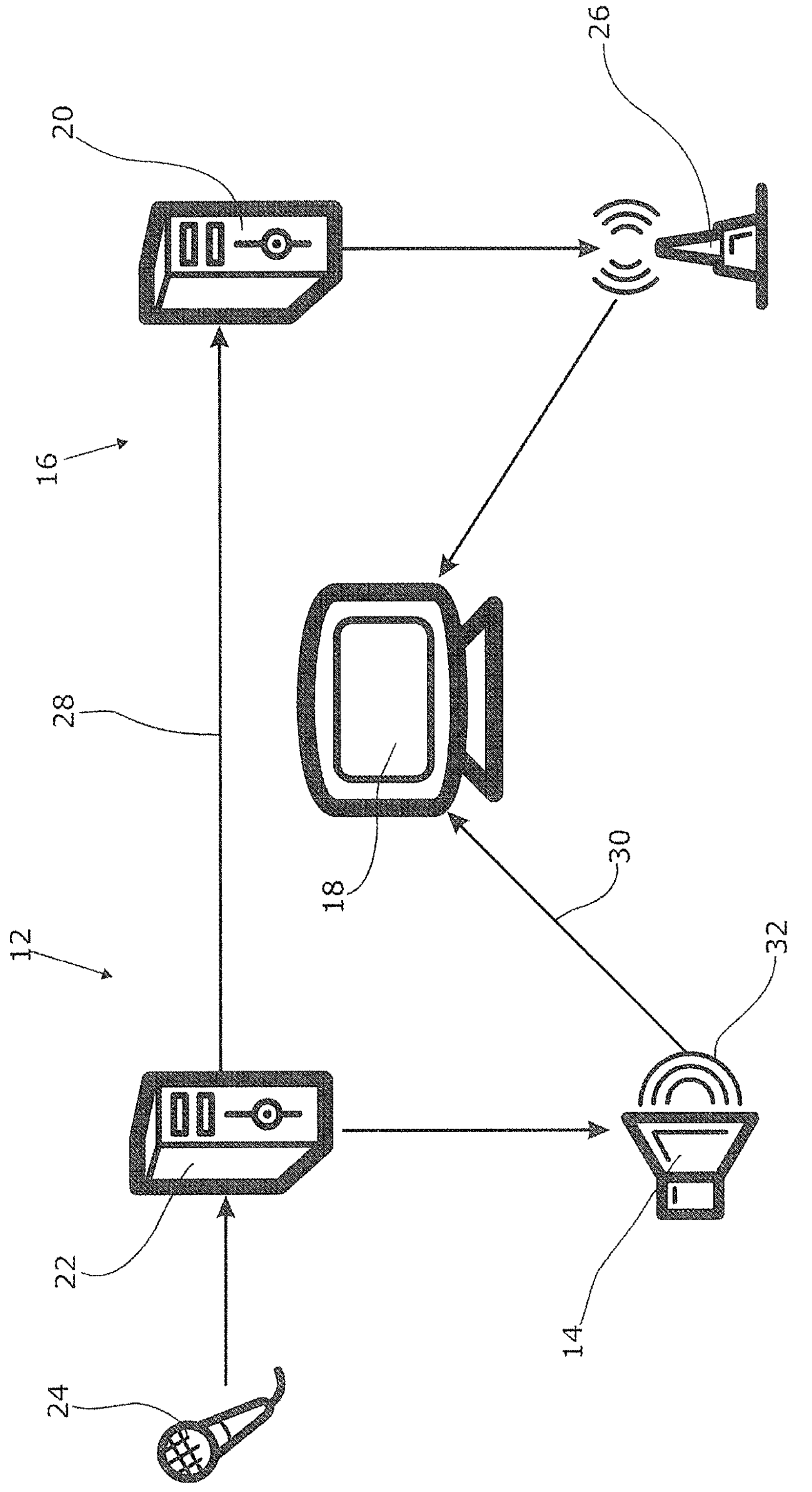
20
26
16
28
12
18
30
32
22
24
14

METHOD FOR PERFORMING ANNOUNCEMENTS IN A MEANS OF TRANSPORT

CROSS-REFERENCE TO RELATED APPLICATIONS

This application is a national stage application under 35 U.S.C. §371 of PCT Application No. PCT/EP2013/051241, filed Jan. 23, 2013, which claims priority to and the benefit of German Application No. 102012202232.5 filed on Feb. 14, 2012, which are incorporated herein by reference in their entirety.

The invention relates to a method for performing announcements in a means of transport, such as in an airplane, a bus, a ship, a train etc.

In such means of transport it is known to entertain passengers via entertainment devices by playing back video/audio data via playback devices. A playback device may be a monitor installed in the passenger cabin for the playback of video/audio data, with a headphone connector being available to each passenger, e.g. in the armrest of the passenger seat, for the playback of associated audio data via headphone. As an alternative or in addition, seat monitors fixedly associated to a respective passenger seat are conceivable as playback devices, the associated audio playback also being performed through a headphone connector integrated in the passenger seat.

In various means of transport, some situations arise that make it necessary to perform announcements for the passengers so as to inform them about certain events of particular importance. Especially in danger situations it is of particular importance to address announcements to the passengers.

In the event of such announcements, it is necessary to interrupt the playback of video/audio data on the playback devices of the entertainment device at least for the time of the announcement, so that the announcement is not interfered with and each passenger can be reached. For this purpose it is known to transmit an announcement start signal from the announcement means to the entertainment device at the beginning of an announcement. The transmission announcement start signal can be performed by wire, for example, from a server of the announcement means to the data server of the entertainment device. When it has received the announcement start signal, the entertainment device automatically causes an interruption of the playback on the playback devices. For this purpose, the data server of the entertainment device must send a corresponding playback stop signal to each playback device. Typically, the transmission of the video/audio data to be reproduced is performed by wire from the data server of the entertainment device to a router and, in a wireless manner, from there to each playback device by radio.

The transmission path of the signals from the announcement device to the entertainment device for the interruption of the playback on a playback device is error-prone. If the data server of the entertainment device fails, the announcement start signal cannot be detected by the entertainment device. If the router of the entertainment device malfunctions, the playback stop signal cannot be transmitted from the data server to the playback devices. Further, radio signal interferences can impair signal transmission. Summarizing, there is a risk that the playback of video/audio data via the playback devices is not interrupted during an announcement and that passengers will not become aware of the announcement.

It is an object of the present invention to provide an improved method for performing announcements in a means of transport.

The method of the present invention is defined by claim 1.

According to the method, an audio signal is outputted via the one or more announcement loudspeakers, which signal is detected by the entertainment device, the detection of the audio signal by the entertainment device automatically prompting an interruption of the playback on each playback device. Thereby, the playback device can be prompted to interrupt playback even if the data server or the router of the entertainment device fail and/or radio signal interferences impair signal transmission. The playback device is typically equipped with a microphone of its own to receive the audio signal emitted by the announcement loudspeakers.

The audio signal may be the announcement signal itself. Here, each playback device is provided with an audio signal analyzer which is connected to the microphone of the playback device and analyses and identifies the announcement signal, and in particular differentiates this signal from other audio signals such as noises in the passenger cabin or passenger voices. When the reception of the announcement signal by the playback device ends, playback is continued. The audio signal analyzer can detect, for example, the carrier frequency of the announcement signal generated by the announcement loudspeaker and/or the total distortion of the acoustic harmonic of the announcement signal.

As an alternative or in addition, the audio signal emitted from the announcement loudspeaker and detected by the entertainment device may be an acoustic pre-signal emitted before the beginning of the announcement. For example, the pre-signal can be a two-channel sound that interrupts the playback. After the announcement has ended, the announcement loudspeaker may then emit a post-signal, e.g. in the form of a specific terminal sound, which is detected by the entertainment device and prompts the continuation of the playback by the playback device. Preferably, the pre-signal and the post-signal are each detected by a microphone of the playback device.

The announcement device can comprise an announcement memory, e.g. in the form of a data server containing stored announcements, and/or may be provided with a microphone for recording announcements spoken by a person, such as a conductor or a flight attendant.

Advantageously, the reception of the audio signal by the entertainment device or by the playback device also prompts the display of a visual indication on the playback device. The optical indication indicates the performance of an announcement, so as to raise the attentiveness of a passenger. As an alternative or in addition, the playback device can be provided with a speech recognition device that converts the recorded announcement signal into a text that is outputted on the playback device. Thereby, passengers with impaired hearing are also enabled to comprehend the content of an announcement.

As an alternative or in addition, the playback device emits a detected announcement signal as an acoustic signal in order to enhance the audibility of the announcement, e.g. via the headphone connector in a passenger seat.

The following is a detailed description of an embodiment of the invention with reference to the Figure. The Figure is a schematic illustration of an arrangement for performing the method of the invention.

The embodiment relates to announcements made in airplanes. The airplane is provided with an announcement device 12 comprising an announcement memory 22, an announcement microphone 24 and an announcement loudspeaker 14. The announcement memory 22 can store typical announcements. Further, the microphone 24 allows the recording of announcement played back in real time via the announcement loudspeaker 14. Further, a plurality of announcement loudspeakers 14 are provided in the airplane cabin.

The airplane further comprises an entertainment device 16 comprising at least one data server 20, a plurality of WLAN routers 26 and a plurality of playback devices 18. The data servers 20 store video films, music data and video games that can be selectively called by each individual playback device 18. Each passenger seat has an associated playback device 18 in the form of a so-called in-seat monitor integrated in the backrest of the respective frontward passenger seat. Further, each playback device 18 has a headphone connector and a headphone, not illustrated in the Figure, for the playback of the associated audio data.

The data played back via the playback devices 18 are first transmitted by wire from the data server 20 to the WLAN routers 26. The WLAN routers 26 convert the data into a radio signal that is transmitted to corresponding radio receivers of the playback devices. As an alternative or in addition, the transmission from the data server 20 to the playback devices 18 can also be performed wirelessly.

Once a flight attendant wishes to make an announcement to the passengers using the microphone 24, the announcement memory 22 first sends an announcement start signal 28, e.g. in the form "PA is in progress" (PA: Public Announcement to the data server 20 of the entertainment device 16. The data server 20 transmits this signal to each playback device 18 via the WLAN routers 26 in order to interrupt the playback there and to display an optical indication "PA is in progress".

The announcement memory 22 simultaneously sends the announcement signal to the announcement loudspeakers 14 for output, the loudspeakers outputting the announcement signal 32 in an acoustic form. Before the announcement loudspeakers 14 emit the announcement signal 32, the announcement memory 22 first prompts the emission of a pre-signal 30 in the form of a second audio sound outputted via the announcement loudspeakers 14. Each playback device 18 is provided with a microphone. Upon reception of the pre-signal 30 by the microphone of a playback device 18, the playback device 18 automatically interrupts the playback of video/audio data. For this purpose, each playback device 18 is provided with an audio signal processor. Upon reception of the pre-signal, the message "PA is in progress" is displayed on the monitor of the playback device 18.

The announcement signal 32 detected by the loudspeaker of a playback device 18 is transmitted to the headphones of the playback device 18 via the audio signal processor of the playback device. Moreover, it is particularly advantageous, if the audio signal processor includes speech recognition that converts the speech of the announcement signal 32 into text outputted on the monitor of the playback device 18 by the audio signal processor.

When the announcement has ended, the data memory 20 sends a post-signal in the form of a terminal sound of a certain frequency via the announcement loudspeakers 14. When the post-signal is received through the microphone of a playback device 18, the latter prompts the continuation of the video/audio data playback.

The audio signal processor of each playback device 18 is further able to detect the carrier frequency, i.e. the envelope of the announcement signal 32 emitted by the announcement loudspeakers 14 and to differentiate, based on the carrier frequency, between the announcement signal 32 and other acoustic signals such as passenger voices or engine noises. In addition or as an alternative, the audio signal processor of each playback device 18 can be configured to detect the total distortion of the acoustic harmonic of the loudspeakers 14 (THD: Total Harmonic Distortion) in order to differentiate between the announcement signal and other noises.

As soon as the audio signal processor of the playback device 18 detects the end of the reproduction of an announcement signal 32, it prompts the playback device 18 to continue the video/audio data playback.

The invention claimed is:

1. A method for performing announcements in a means of transport that has an announcement device having at least one loudspeaker and an entertainment device having at least one playback device, having the following steps:

a) an announcement start signal is sent from the announcement device to the entertainment device at the beginning of an announcement, b) an interruption to the playback of the playback device is prompted by the entertainment device when the announcement start signal is received, c) the announcement is played back as an audible announcement signal via the announcement loudspeaker, d) continuation of the playback of the playback device is prompted by the entertainment device when an announcement end signal is received or at the end of reception of the announcement start signal from the announcement device, characterized by detection of an audio signal that is output by the announcement loudspeaker by the entertainment device, wherein the playback of the playback device is automatically interrupted after the audio signal is detected.

2. The method of claim 1, wherein the audio signal is the announcement signal and is detected by an audio signal analyzer and is differentiated from other noises, the playback being continued at the end of the audio signal reception.

3. The method of claim 2, wherein the audio signal analyzer analyses the carrier frequency of the announcement signal generated by the announcement loudspeaker.

4. The method of claim 2, wherein the audio signal analyzer detects the total distortion of the acoustic harmonic of the announcement signal.

5. The method of claim 1, wherein the entertainment device detects the audio signal via a microphone of a playback device.

6. The method of claim 1, wherein the audio signal is a pre-signal sent via the announcement loudspeaker before the beginning of the announcement, wherein, after the end of the reproduction, the announcement loudspeaker emits a post-signal that is detected by the entertainment device and prompts the playback device to continue playback.

7. The method of claim 1, wherein the announcement device comprises an announcement memory with stored announcements and/or a microphone for recording an announcement spoken by a person.

8. The method of claim 1, wherein the video/audio data are transmitted from a data server of the entertainment device to a router which transmits a video/audio data wirelessly to the playback devices.

9. The method of claim 1, wherein after step a), the reception of the audio signal by the playback device also prompts the same to indicate a visual indication on an indicator that an announcement is in progress.

10. The method of claim 1, wherein the playback device is provided with speech recognition that converts the announcement signal into a text displayed on a display of the playback device.

11. The method of claim 1, wherein the playback device outputs a detected announcement signal as an acoustic signal.

* * * * *